United States Patent [19]

Anderson

[11] 3,844,615

[45] Oct. 29, 1974

[54] HYDRAULIC OPERATED DUMPING SPOUT AND COVER FOR SIDE DUMP BOX

[75] Inventor: Robert Duwayne Anderson, Murdock, Minn.

[73] Assignee: TCI, Inc., Benson, Minn.

[22] Filed: May 22, 1973

[21] Appl. No.: 362,748

[52] U.S. Cl. ...................... 298/10, 49/248, 49/345, 214/307, 214/314, 220/37, 298/23 C, 298/22 P

[51] Int. Cl. .......................................... B65g 67/50

[58] Field of Search ................. 298/10, 22 P, 23 C; 214/307, 312, 314; 220/37, 38; 49/246, 248, 345

[56] References Cited

UNITED STATES PATENTS

| | | | |
|---|---|---|---|
| 2,134,785 | 11/1938 | Goldberg et al. | 49/246 |
| 3,101,974 | 8/1963 | Robertson et al. | 298/22 P |
| 3,338,623 | 8/1967 | Morrison | 49/246 X |
| 3,424,498 | 1/1969 | Maxon, Jr. | 298/22 P |
| 3,494,219 | 2/1970 | Hillhouse | 220/37 X |

*Primary Examiner*—Allen N. Knowles
*Attorney, Agent, or Firm*—Dugger, Johnson & Westman

[57] ABSTRACT

A cover and dumping spout for use in a side dump box, such as a dump tender used for carrying bulk inorganic fertilizer in the field, which includes a hydraulic cylinder that, when operated in a first direction simultaneously moves the dumping spout to working position and moves the cover to open position through a linkage so that the unit is ready to use and can be dumped. The spout folds to a stored position and the cover member moves to closed position when the cylinder is reversed in direction of operation.

7 Claims, 6 Drawing Figures

25
31
26
34
41
40
43
44
27
27
30
51
42
50
53
49
17
32
33
21
16
18
35
15
10
13
12
22
11

44
44
42
42
43
52
52
53
53
54
13
13A
23
20
20
12

27
31
25
30
32
26
33
35
34
51
50
5
6

41
42
56
55
52
53
15
21
42
53
14
13
20

5
41
43
44
55
45
5
52
15
42

43
41
44
15
46
45

HYDRAULIC OPERATED DUMPING SPOUT AND COVER FOR SIDE DUMP BOX

BACKGROUND OF THE INVENTION

1. Field of the Invention.

The present invention relates to a combination dumping spout and top cover for a side dump box which are operated hydraulically.

2. Prior Art.

In the prior art, the use of side dump vehicles with a high dump level and large capacity is increasing particularly where an applicator or spreader must be filled periodically. In most instances, it is desired to have a dumping spout to increase effective lateral extension of the dumping edge. It is also desirable to have a cover over the box or compartment so that the material kept in the box is not damaged by weather, nor blown out and lost by wind or the like.

SUMMARY OF THE INVENTION

The present invention relates to a dump box which has a power operated dumping spout and top cover.

In the present device, as shown, the dumping spout is moved between a folded, low level position and a dumping position and the top cover for the box is moved from a closed to an open position simultaneously. Linkages are provided so that the top cover moves laterally to the side of the box, and also downwardly to hold the top cover securely during the operation of the unit and without greatly increasing the overall height of the box when it is dumped, or when it is in lowered position. When the dumping spout is in working position it extends laterally from the side wall of the box having the dumping edge to form an effective lateral extension so the material is deposited at a laterally spaced location with respect to the support for the dump box. The spout is held tightly against the top side and acts as a positive sealing member to limit or eliminate spillage.

The unit is simple to manufacture, easy to operate, and does not require manual effort to actuate. Hydraulic power is available on these units because of the normal use of hydraulic cylinders for the dumping operation.

The unit can be used on trailer mounted units, truck mounted units or other desired units.

If desired, the unit can be made with a power actuated cover only. The linkages are made to conveniently move the top to position where it opens fully and when the box is in its lowered position, the cover does not extend very far above the plane of the top of the box.

DESCRIPTION OF THE PREFERRED EMBODIMENT

Figure 1:
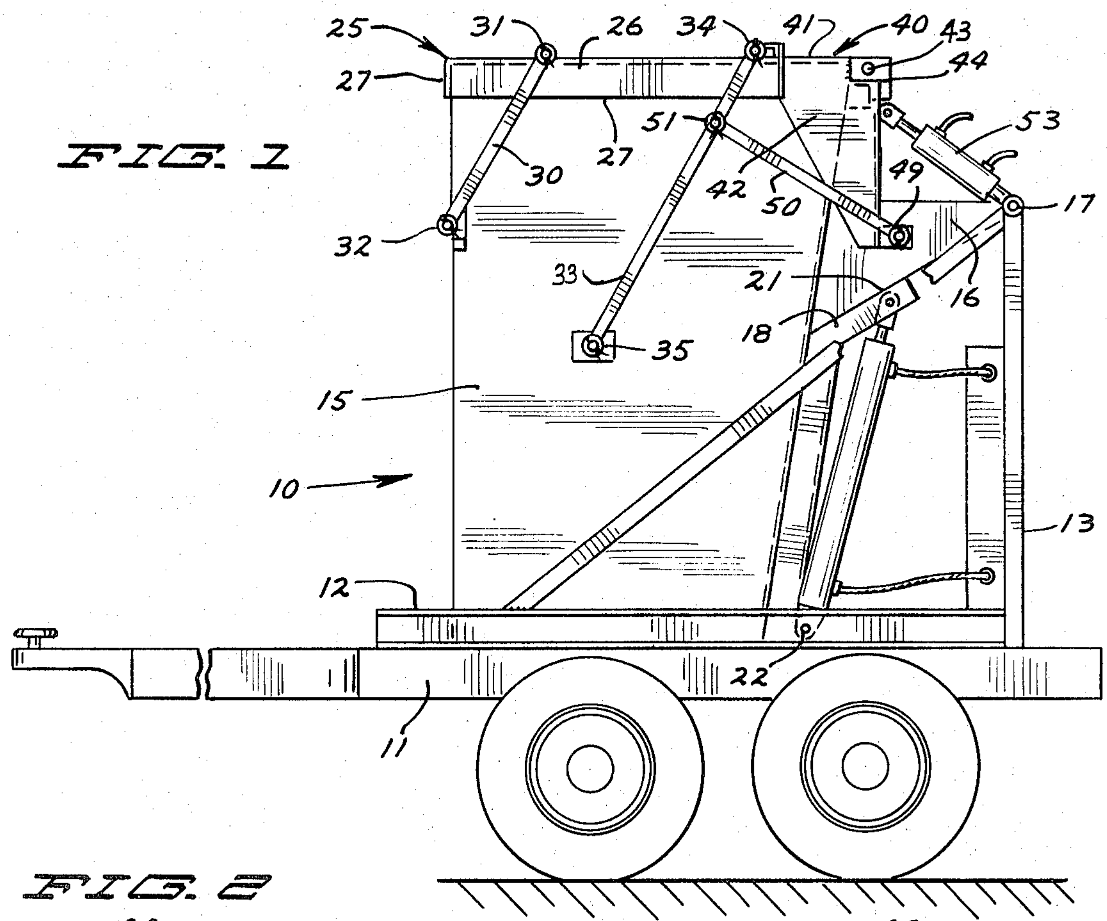
FIG. 1 is a side elevational view of a side dump box shown mounted for dumping to the rear side of a trailer.

A side dump box illustrated generally at 10 is mounted upon a transport vehicle 11, such as a trailer or a truck, and has a support frame 12 which includes upright side frame members 13 and braces 13A and 14. The box or compartment 15 has an outwardly or laterally extending support 16 fixed to the dumping wall that is pivotally mounted as at 17 to the upper ends of upright members 13 and is positioned between these members 13.

Figure 2:
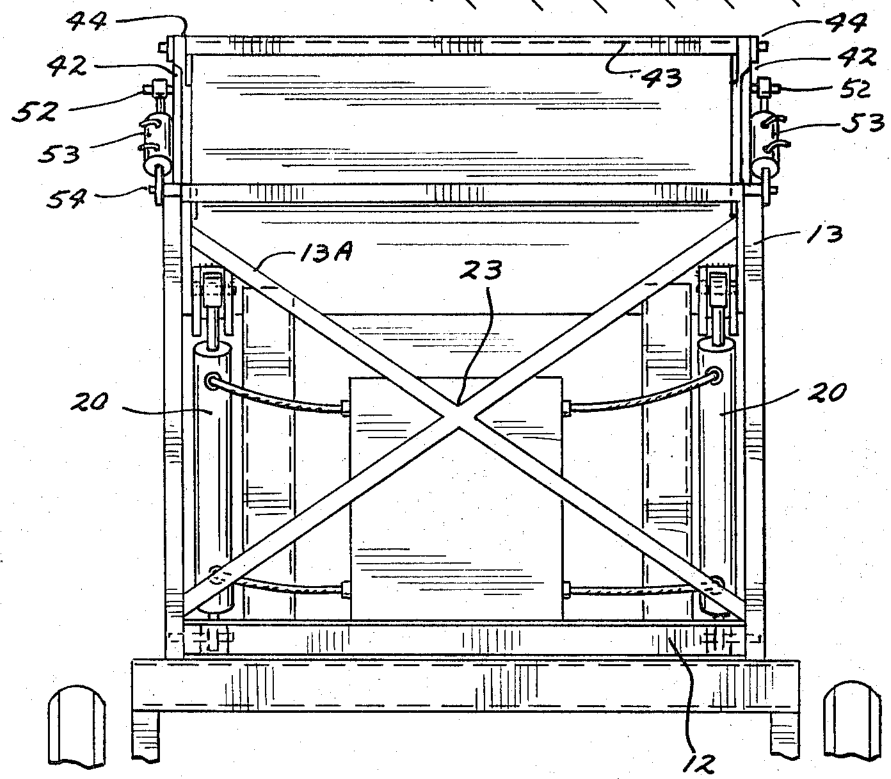
FIG. 2 is a rear view of the device of FIG. 1.

Suitable reinforcing brackets 18 are mounted underneath the laterally extending support 16 and the brackets 18 are positioned on opposite sides of the laterally extending support 16 as can be seen in FIG. 2. A pair of hydraulic cylinders 20 are mounted to the supports 18 respectively, at first ends thereof and to the lower frame 12 at second ends thereof, as shown at 21 and 22 respectively. These cylinders 20 are connected to a suitable control system 23 that can include valves and a hydraulic storage reservoir so that the cylinders can be actuated in a normal manner. As shown, they are double acting cylinders having internal pistons and rods that can be actuated for extension and retraction.

Figure 3:
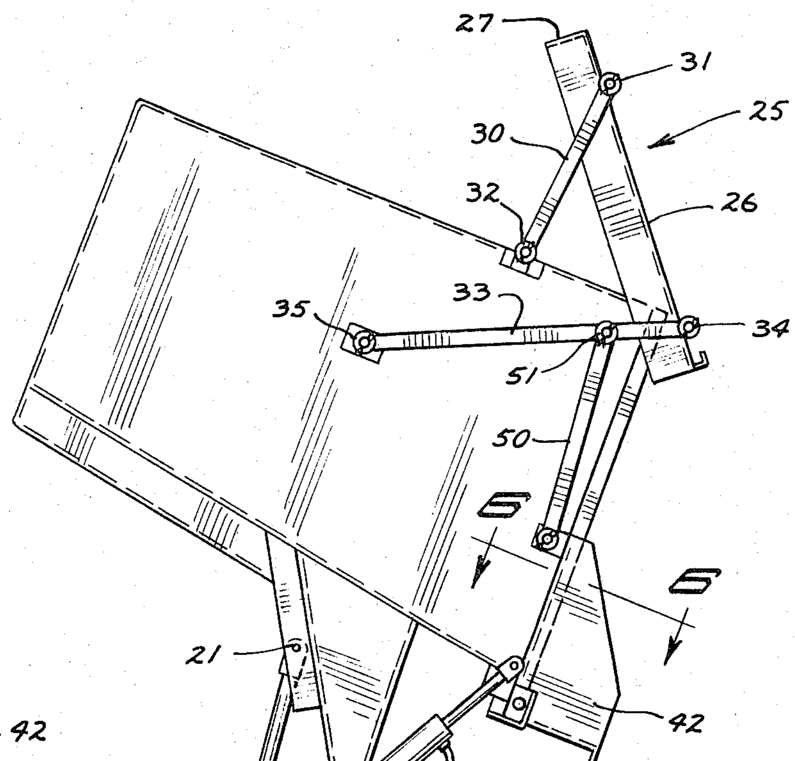
FIG. 3 is a fragmentary side view of the device of FIG. 1 showing it in its dumping position.

The box 15 is thus mounted so that it can be tilted to position about the pivotal mounting 17 as shown in FIG. 3 by actuation of the hydraulic cylinder 20. Dumping boxes of the general type are well known in the art. As shown, the box is dumped to the rear of the trailer 11, but of course, in most instances the box would dump to the side of the support vehicle, such as a truck.

Side dump boxes are used to carry various agricultural materials. As shown, the box 15 has a top cover assembly designated generally 25. This top cover assembly includes a first cover member 26 that has a cross panel covering the top of the box, and downwardly depending side flanges 27 that fit outside of the box 15 along three of the outer sides thereof as shown in the drawings. Cover member 26 is mounted to the box 15 with four links. There are two links on each of the front and rear sides, and as shown, include a pair of first links 30 that are attached to pins 31 fixed to the cover 26 on the front and rear sides and second pins 32 that are fixed to the forward and rear walls of the box 15. These pins 31 and 32 pivotally mount the first links 30, so that the links are free to pivot. A pair of second links 33, which are longer than the first links 30, are also used for attaching the cover 26 to the box 15. The links 33 are mounted on pins 34 which are attached to opposite edges of the cover 26, and to pins 35 which are attached to the sides of the box 15. The links 30 and 33 support and guide the top cover as the cover is moved relative to the box. When the cover is in open position and the box is in its lowered position as shown in FIG. 1, the highest edge of the cover is not raised above the box a substantial amount. Most of the cover is below the plane of the top of the box and along the side of the box opposite from the dumping side. Thus the mounting of the cover alone is an important feature of the device.

The box as shown is also provided with a dumping spout or chute assembly illustrated generally at 40, which, when in a folded position as shown in FIG. 1 also forms part of the cover over the box 15. The pivoting spout 40 has a cross wall panel 41 extending laterally across the top of the box in folded condition, and downwardly depending side legs 42 that are fixed to the cross wall panel 41, and are positioned on the opposite sides of the box 15. The cross wall panel 41 has a cross tube 43 fixed along the back side thereof, and this cross tube 43 is pivotally mounted on suitable brackets 44 mounted on opposite sides of the box. The tube is fixed to the wall 41, and forms a reinforcement for the spout in addition to providing the pivot member for the spout.

Figure 4:
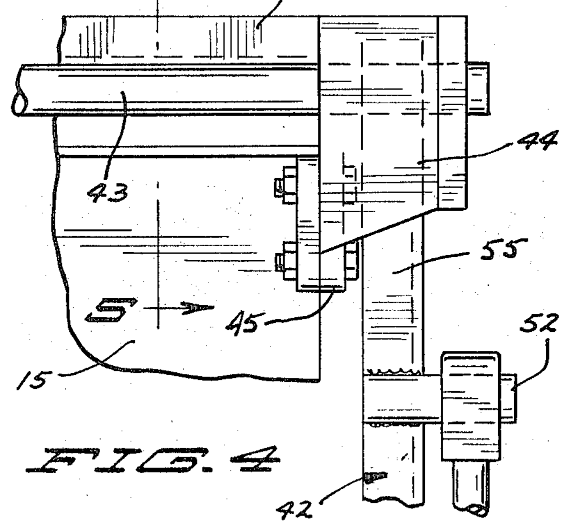
FIG. 4 is an enlarged rear view of one corner of the box showing the mounting structure for the dumping spout of the box.
Figure 5:
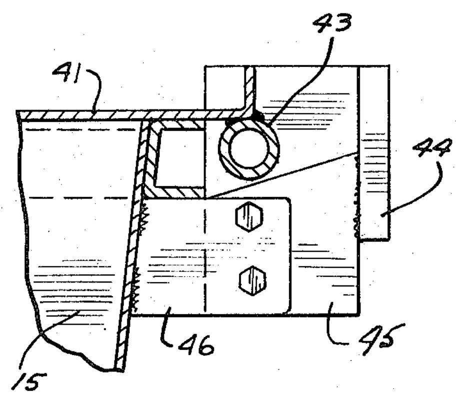
FIG. 5 is a sectional view taken on the line 5—5 in FIG. 3.

The brackets 44 are positioned around the outer ends of side panels 42 of the chute assembly and are used to rotatably mount the ends of the tube 43 which project outwardly beyond the brackets 44. As can be seen in FIGS. 4 and 5, the brackets 44 include a mounting portion 45 that is bolted to another bracket 46 that is attached to the wall of the box 15. The brackets 44 are made so that they can be bolted in place to hold the spout 40 in position. The inner edge of the spout 40 and the tube 43 extend right along the upper edge of the wall of box 15 which is the dumping wall when the box is dumped.

The side panels 42 of the spout are used as control arms for the assembly, and have pins 49 mounted at the outer ends thereof and the pins 49 in turn are used for pivotally mounting first ends of links 50 that have second ends pivotally mounted on pins 51 which are fixed to midportions of the links 33. The links 50 are compression carrying actuating links for moving the cover 26 to open position when the spout 40 is moved to its operable position. The position of the pins 50 with respect to the pins 34 and 35 which mount the links 33, is selected to give the desired amount of movement to the cover 26 as the spout 40 is pivoted to its working position.

Each of the control arms 42 is reinforced so that it has sufficient strength for operating the unit. The arms 43 mount pins 52 which are positioned between the pivot for the unit at brackets 44 and the pins 49. A pair of hydraulic cylinders 53 have rod ends that are mounted onto the pins 52 and the base of the cylinders are mounted onto pins 54 on the pivot supports 17 where the box 15 pivots. The pins 54 extend outwardly from the pivot member 17 on supports 13. The cylinders 53 are in turn operable through a suitable valve (not shown) included in the controls 23. When the cylinder 53 is extended, the arms 42 will pivot about the axis of tube 43 and the spout 40 will pivot toward working position. The movement of the lower ends of the control arms 42 will cause the links 50 to move the links 33 about their pins 35. The upper ends of links 33 move the cover 26 toward the side of the box and links 30 will pivot as the cover 26 is moved. The links 30 and 33 will guide the cover to move to a position as shown in FIG. 3 as the spout assembly 40 unfolds.

The cylinders 20 may be actuated so that the box is pivoted to its dumping position as shown in FIG. 3. It can also be seen that when the chute is fully erected as shown, the cross wall 41 of the spout, which form part of the cover over the top of the box when the unit is closed, becomes the pouring or dumping surface of the spout, and the side or arm members 42 help to contain material flowing across the spout from the wall of the dumping box 15. Movement of the cover 26, is to substantially a full open position, and cover is guided into a convenient location adjacent the side of the box 15 by action of the links 30 and 33.

Figure 6:
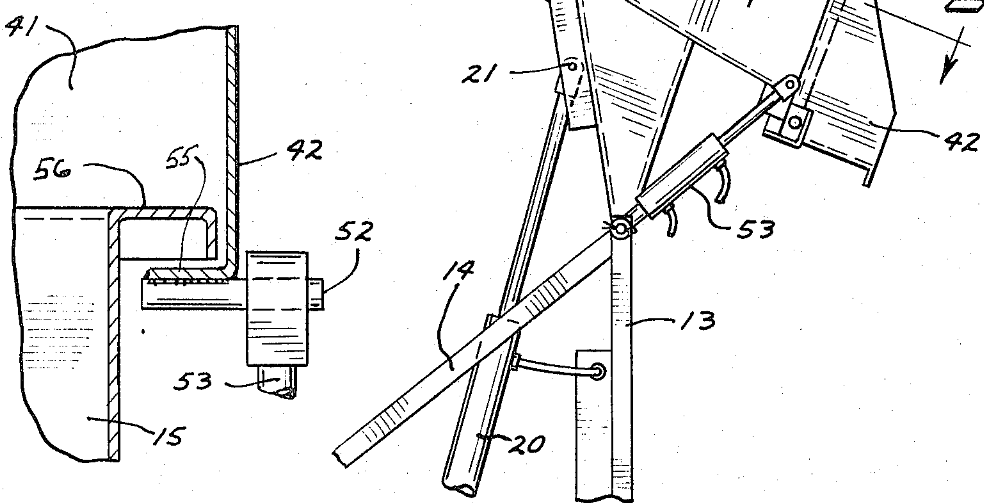
FIG. 6 is a sectional view taken as on line 6—6 in FIG. 3.

Further, it can be seen that the control arms 42 have bent over legs 55 on the edges thereof where the pins 52 are attached, and these legs 55 are of size to engage a bent over lip 56 that is formed around the top edges of the side walls of the box 15. Thus the lip 56 forms a stop for the spout 40 when the cylinders 53 are extended. This is shown in FIG. 6. The dumping spout 40 is thus positively stopped in its working condition. The pivot tube 43 of course is positioned so that it clears the brackets 44, and the control arms 42 also clear the sides of the box 15 during movement, except in the stopped position with the spout in working position where the lip 56 of the box engages the leg 55 of the control arm 42.

Note that the cross wall 41 forms a pouring or dumping extension for the dumping wall of the box 15 to permit dumping of the material at a point laterally spaced from the box. The folding action of the spout, to non-dumping position, keeps the overall width of the unit to a reasonable size.

When the spout is to be folded back and the cover is to be replaced, the cylinders 53 are merely retracted by operation of the control valve, and the links 50 act as tension members acting again on the links 33 to pull the links about their pins 35, and the links 30 about pins 32, so that the cover 26 will be returned to its position as shown in FIG. 1 overlying the top of the box 15. The dumping spout assembly also will be returned to its position. In the region where the cover member 26 and the dumping spout 40 meet, suitable sealing means can be provided such as a resilient gasket, to insure an adequate seal for the purposes. The device positively controls the positioning of the spout 40 so that it is assured that the unit will be in its proper position when the box is dumped as shown in FIG. 3.

The cover 26 can also be opened for filling the box 15 merely by operating the cylinder 53.

The unique mounting of the cover 26 also is an advantage even if the cover 26 was directly operated by a cylinder, for example cylinders connected between pins 54 and 51, without using a power actuated spout.

What is claimed is:

1. A dumping box tiltable about an axis extending along one side thereof and above the lower portions of the box to permit dumping material from the box along one upper edge, including a dumping spout member mounted adjacent said one upper edge having a wall positionable in a first spout position to extend the effective dumping edge of the box outwardly from said one upper edge, a cover member for said box, means to mount said cover member on said box for movement relative to said box from an open to a closed position, linkage means connected to said cover member and to said dumping spout member, power actuating means, and means to connect said power actuating means to control movement of said dumping spout member and said cover member between their respective positions through said linkage means.

2. The combination as specified in claim 1 wherein said dumping spout member comprises a first wall member, said first wall member being movable from a position overlying said box when the dumping spout member is in a second stored position, to a position to receive material discharged from said box when the box is tilted, and to guide material from the box laterally outwardly from the one upper edge of said box in the first spout position.

3. The combination as specified in claim 1 wherein said means to mount said cover member comprises a plurality of pivoted links, said links being pivotally mounted to said cover member and to said box to provide guidance of said cover member as said cover member is moved to its open position.

4. The combination as specified in claim 3 wherein said linkage means includes an actuator link connected between said dumping spout member and said pivoted links.

5. A dumping box having sides and an open top and including a frame, means to pivotally mount said box to said frame for pivotal movement about a first axis positioned above the bottom of the box and along a dumping side of the box, power means to tilt said box about said dumping axis, and a dumping spout and cover combination for said box comprising a cover member of size to fit over at least a portion of the open top of said box, and a dumping spout member, means to mount said dumping spout member to said box adjacent the dumping side thereof to be movable from a stored position to a dumping position, means to mount said cover member to said box for guidably supporting said cover member for movement from a closed position wherein said cover member is over the top of said box to an open position where said cover member is clear of a substantial portion of the top of said box, linkage means connecting said dumping spout member and said cover member whereby pivotal movement of said dumping spout member and movement of said cover member occur simultaneously, and power means connected to actuate said dumping spout member and said cover member to positions wherein said cover member is in its open position, and said dumping spout member is in its dumping position to form an extension from the dumping side of said box.

6. The combination of claim 5 wherein said means to mount said cover member include a plurality of links for supporting and guiding movement of said cover member to its open position, means to pivotally mount first ends of said links to said cover member and means to mount second ends of said links to said box.

7. In a box having sides and an open top and including a frame, a cover member of size to fit over at least a portion of the open top of said box, means to mount said cover member to said box comprising first pivoted link means attached to said cover member adjacent a first edge of the cover member and to said box, and second pivoted link means attached to said cover member adjacent a second opposite edge of said cover member and to said box, said first and second link means being of different lengths and guiding said cover member for movement from a closed position wherein it is over the top of said box to an open position where it is clear of a substantial portion of the top of said box and said second edge and a major portion of the cover member are between a plane passing along the top of the box and the normal bottom of the box and are laterally offset from the box a distance substantially less than the distance between the first and second edges, power means, and means connected between said power means and said cover member whereby actuation of said power means controls movement of said cover member between its closed and open postions.

* * * * *